United States Patent [19]

Woo

[11] Patent Number: 5,555,222

[45] Date of Patent: Sep. 10, 1996

[54] LOW DISTORTION GEOPHONE SPRING

[75] Inventor: Daniel Ming-Kwong Woo, Missouri City, Tex.

[73] Assignee: Shaw Industries Limited, Rexdale, Canada

[21] Appl. No.: 312,094

[22] Filed: Sep. 26, 1994

[51] Int. Cl.$^6$ .............................. H04R 9/00; H04R 11/00
[52] U.S. Cl. ...................... 367/187; 367/183; 267/161
[58] Field of Search .................................. 367/183, 187; 267/161, 163

[56] References Cited

U.S. PATENT DOCUMENTS

| | | |
|---|---|---|
| 2,715,680 | 8/1955 | Tatel et al. ............................ 367/183 |
| 2,748,370 | 5/1956 | Baltosser . |
| 2,947,529 | 8/1960 | Schwartz et al. . |
| 3,170,736 | 2/1965 | Wright . |
| 3,344,397 | 9/1967 | Elliott et al. . |
| 3,628,383 | 12/1971 | Tikanen et al. . |
| 3,738,445 | 6/1973 | Wilson et al. . |
| 3,742,441 | 6/1973 | Riley . |
| 3,913,063 | 10/1975 | Sears . |
| 3,953,829 | 4/1976 | Boyle . |
| 4,144,520 | 3/1979 | McNeel . |
| 4,152,692 | 5/1979 | McNeel . |
| 4,159,464 | 6/1979 | Hall, Jr. . |
| 4,285,054 | 8/1981 | McNeel . |
| 4,323,994 | 4/1982 | Coogler . |
| 4,458,344 | 7/1984 | Coogler . |
| 4,504,932 | 3/1985 | Sundt . |
| 4,623,991 | 11/1986 | Vitringa . |
| 4,685,094 | 8/1987 | Vitringa et al. . |
| 5,119,345 | 6/1992 | Woo et al. . |
| 5,134,593 | 7/1992 | Logan et al. . |
| 5,134,594 | 7/1992 | Woo . |

FOREIGN PATENT DOCUMENTS 0188014   7/1986   European Pat. Off. .

OTHER PUBLICATIONS

Chen, S. J. and Chen, K., (1988, Oct.). Journal of Physics E. Scientific Instruments, vol. 21, No. 10, pp. 943–947.

Primary Examiner—Michael J. Carone
Assistant Examiner—Christopher K. Montgomery
Attorney, Agent, or Firm—Vaden, Eickenroht & Thompson, L.L.P.

[57] ABSTRACT

An improved reduced distortion spring spider for geophones is disclosed that has the desired ratio of spurious resonant frequency to the natural frequency of the geophone and can absorb the sharp lateral forces imposed on the geophone during destructive testing and field usage.

12 Claims, 6 Drawing Sheets

LOW DISTORTION GEOPHONE SPRING

This invention relates generally to geophones and, more particularly, to suspension springs for geophones.

A geophone is a device that senses motion by the movement of a coil in the field of a permanent magnet. Typically, the mass is an annular coil form suspended by springs in the annulus between a magnet assembly and the housing or casing of the geophone. Usually, one spring is attached at each end of the coil form. The springs position the coil form within the magnetic field of the magnet assembly so that the coil form is centered laterally and along the axis of the magnetic field. The springs also form a suspension system having a predetermined resonant frequency.

In seismic operations, seismic waves (vibrations) are created in the earth's crust at or near the earth's surface and portions of those seismic waves are reflected from the boundaries of subsurface layers. Geophones are arranged in arrays or groups on the earth's surface and are moved by the seismic waves. The coil form, which is suspended between the two springs, tends to lag behind the movement of the geophone housing, which cause the coil form to oscillate in the magnetic field of the magnet assembly producing a voltage at the output of the geophone. The outputs of the arrays of geophones are recorded from which the depth and shape of subsurface formations can be determined.

In present day geophones, spider springs are used extensively to support the coil mass. Such springs are usually made from discs of spring material and have an inner ring and an outer ring that are connected by a plurality of arms. The arms are formed by etching or stamping slots in the spring material in accordance with a predetermined pattern that forms the arms. The slot patterns are typically generated by hand and reduced or by computer aided design equipment and a laser dot printer. Generally, three such arms are used, and the three-armed arrangement is generally considered the most advantageous.

The arms of geophone spider springs usually have a rectangular cross-section and are curved along their lengths between the junctures with the inner and outer rings of the spring. After the arms are formed, the spring is "preformed" according to known techniques. When preforming is complete, the inner ring is offset or displaced relative to the outer ring, such that when the) coil mass is suspended on the outer ring of two such springs, the inner ring, arms, and outer ring of each spring lie in the same plane.

The coil mass of a geophone has more than one degree of freedom. A geophone is intended to sense motion of the coil form in a direction that is parallel to the longitudinal axis of the geophone housing. Therefore, motion of the coil form at right angles to the desired motion produces a spurious signal or response, which produces an undesired or false EMF in the coils.

In seismic operations, motion that is not truly parallel with the geophone axis may produce an undesired or false EMF in the coils. Because of its low damping, the movement will continue for some time after the force that caused it has subsided. This resonance is considered to be the main spurious frequency in a geophone and it is highly undesirable as it limits the geophone's upper clean bandwidth.

Inasmuch as the geometry and the mass of the coil form for a given model of geophone are constant within manufacturing limits, the spurious resonance is also constant. The frequency of the spurious resonance can therefore be raised or lowered by changing the geometry of the suspension springs. This characteristic has been used to raise the frequency of these false signals until they are beyond the desirable frequency spectrum of the geophone by increasing the lateral stiffness of the spring. With this approach, these false signals do not interfere with or corrupt signals of interest. A prior art method of increasing the lateral stiffness of the spring is to shorten the spring arms. Unfortunately, the signal distortion caused by spring non-linearity is increased when the arms are relatively short and spring life is reduced.

With the technological advances in the signal recording equipment and the advent of the 24 bit digital recording system, the geophone distortion and spurious response of a geophone are the limiting factors of the dynamic resolution and high frequency resolution of the recording system. Therefore, it is necessary to decrease the amount of distortion produced by the spring in addition to achieving a high spurious response.

Both U.S. Pat. Nos. 4,323,994 and 4,458,344 disclose geophone springs whose arms have a straight center section, one of constant width and one of tapered width (wider in the center than at the ends). Even though the straight sections cause these springs to achieve a high frequency spurious response, the straight sections make the spring too stiff to rotate while oscillating axially, thus creating higher distortion.

Figure 1A:
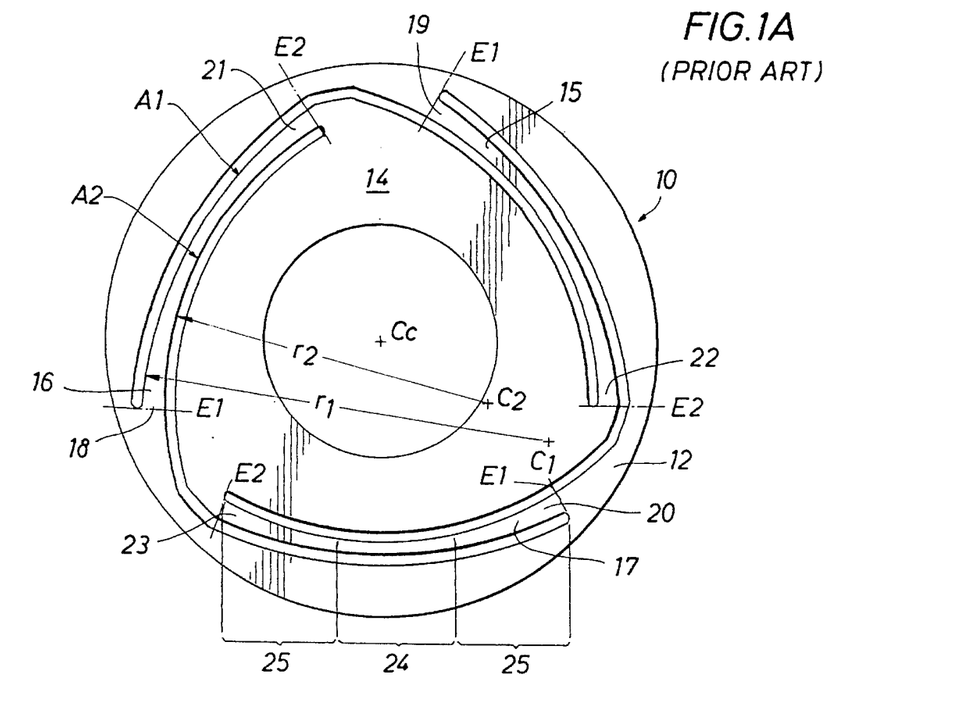
FIGS. 1A and 1B are plan views of prior art geophone springs.

The effort to achieve much higher resonant frequencies, but without the increased distortion, continued with the development of the spring described in U.S. Pat. No. 4,623, 991 ("the '991 patent"). This spring, shown in FIG. 1A, is a tapered arm, two arc (a1 and a2) spring designed to have arms as straight as possible, yet maintain a slight curvature to avoid the stiffness problem described above. In the preferred embodiment, the two arcs have different radii and different center points c1 and c2 which provides the curvature. Since the arcs have different radii and different center points, the length of the curved center section is limited by the desire to achieve wider areas at the juncture points. The specification specifically states that the distortion causing non-linearity of the spring is reduced by making the arms as straight as possible and by tapering the arms from the center to the ends. Since the spring arm is defined by only two arcs the amount of taper is limited by the desired length of the leg relative to the desired taper and vice versa. Therefore, even though, a high frequency spurious response is obtainable, at least 0.2% distortion is present in this spring, which is undesirable in the new signal recording equipment.

U.S. Pat. No. 4,685,094 describes a lateral compliance device to be used in conjunction with the spring described in the '991 patent, to reduce damage to the spring due to lateral shock. The lateral compliance device was formed by overlapping arcuate slots adjacent to the edge of the central opening through the spring. This device, however, does not reduce distortion.

In yet another effort to produce a spring with high frequency spurious response to the natural frequency of the spring that can withstand sharp lateral force, the assignee of the present invention developed the spring disclosed in U.S. Pat. No. 5,134,594. The spring includes arms that are generally L-shaped having one long arcuate section and one relatively short straight section that is connected to the long section at an angle. Although this spring achieves the high frequency spurious response and is more resistant to lateral forces, the amount of distortion is not less than the springs described above, which is not small enough for the new signal recording equipment.

Therefore, it is a feature of this invention to provide a geophone spring design that has very low distortion and a high ratio of the spurious frequency response to the natural frequency of the spring.

It is a further object of this invention to provide a geophone spring having inner and outer annular rings connected by spring arms of increased stiffness producing a spurious frequency response that is more than 25 times the natural frequency of the spring and having only approximately 0.05% distortion.

It is a further object of this invention to provide such a geophone spring in which each spring arm comprises at least three sections wherein the outside edge of each arm comprises one or more curved surfaces and the inside edge of each arm comprises at least three curved surfaces, creating an arm having an outer section, inner section, and at least one intermediate section, to provide each arm with a thinner intermediate section over a longer distance and wider outer and inner sections to compensate for any nonlinearity of the system to reduce the distortion of the spring.

It is yet another object of this invention to provide such a geophone spring in which the outside edge of each spring arm has a plurality of curvatures such that the radius of curvature at any point is located on the opposite side of the intermediate of the disc and an inside edge having a plurality of curvatures such that the radius of curvature at any point is never greater than the radius of curvature of the outside edge.

It is a further object of this invention to provide a geophone spring having an intermediate section and two end sections with the intermediate section of the arm having a constant width and making up at least 2% and no more than 30% of the total length of the arm measured along the inside edge and with the width of the end sections increasing from the ends of the intermediate section to the ends of the arm with the inner edge of the end sections following a spiral curve.

These and other objects, advantages, and features of this invention will be apparent to those skilled in the art from a consideration of this specification including the attached drawings and appended claims.

Figure 1B:
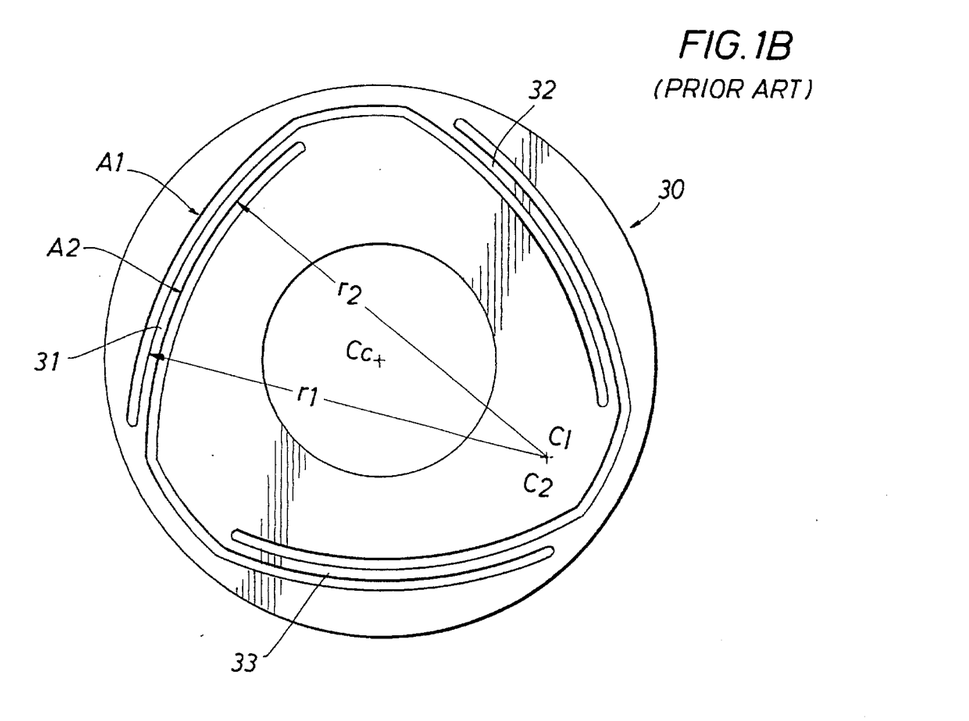

FIGS. 1A and 1B show plan views of two prior art geophone springs 10 and 30. Spring 10 of FIG. 1A includes outer ring member 12 connected to inner ring member 14 by three arms 15, 16, and 17. The arms are curved about the center of the spring and extend from juncture points 18, 19, and 20 on outer ring 12 to juncture points 21, 22, and 23 on the inner ring 14, respectively. Each arm is defined by two arcs a1 and a2 and imaginary lines E1 normal to a2 intersecting the end of arc a1 and imaginary line E2 normal to a1 intersecting the end of arc a2. The inner arc a2 has a radius of at least 1.25 times greater than the distance from center Cc of the spring.

The spring shown in FIG. 1A has two arcs a1 and a2 that have different radii and different centers of curvature c1 and c2. As a result, the width of center section 24 is narrower than inner and outer sections 25. The spring in FIG. 1B has three arms 31, 32, and 33 of uniform width and the same radius of curvature. Arm 31, for example, curves around centers c1 and c2 with radii r1 and r2. The spring design of FIG. 1A is superior to the design of FIG. 1B, because constant width arms are more rigid and more susceptible to damage from sharp lateral forces imposed on the spring during testing and shipping. The arms of FIG. 1A include inner and outer sections, for example, end sections 25 on arm 17, that increase in width away from center section 24. This provides shock absorption of some lateral forces in exchange for reducing the length of center section 24, which results in increased distortion. This spring design compromises the ability to achieve reduced distortion by the need to provide shock absorption to lateral forces.

Figure 2A:
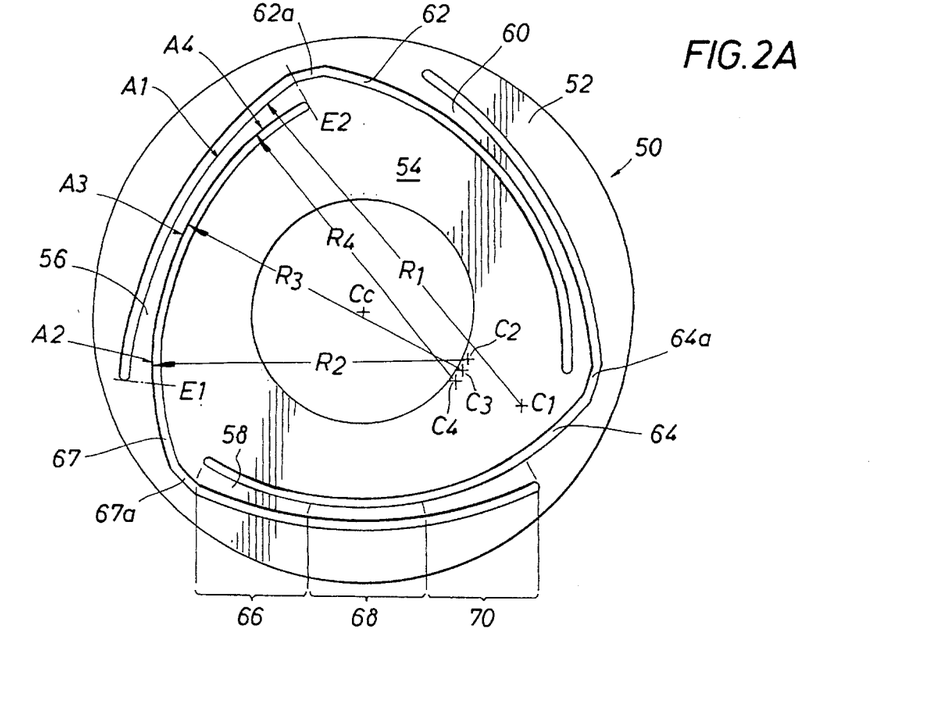
FIGS. 2A and 2B are plan views of the geophone spring of this invention.
Figure 2B:
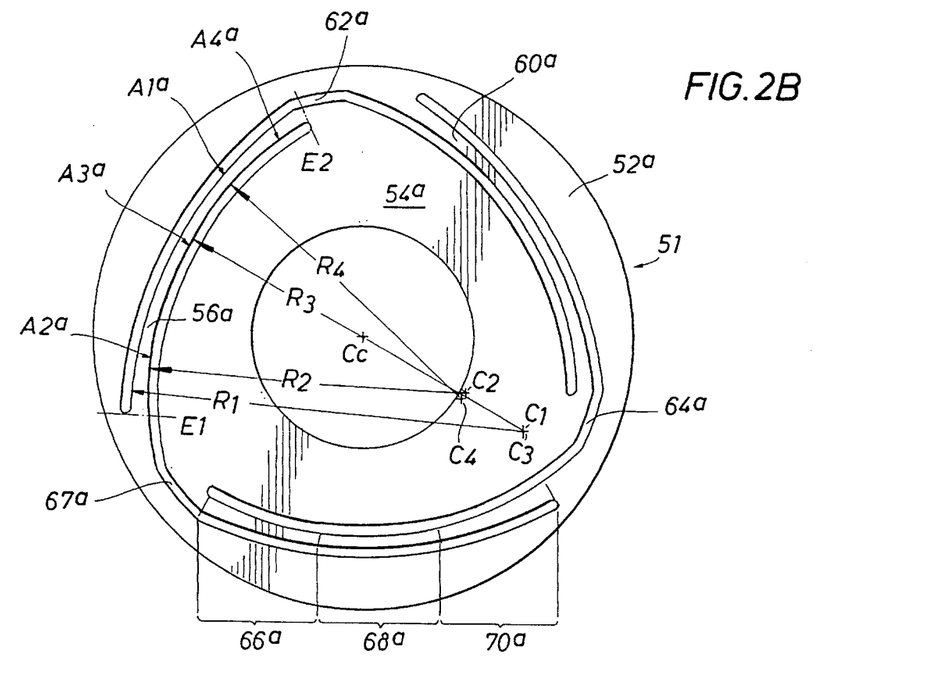

In FIGS. 2A and 2B, springs 50 and 51 illustrate the preferred embodiment of this invention. Both springs are less susceptible to lateral shock and have a very low distortion, on the order of 0.05%. Referring first to FIG. 2A, spring 50 includes outer ring member 52 and inner ring member 54 that are connected by spring arms 56, 58, and 60. The spring arms are formed by etching or stamping the spring material in accordance with the predetermined pattern, by methods well known to those of ordinary skill in the art. In this case, the arms are formed by three grooves 62, 64, and 67. Each groove extends along the outside edge of one of the arms and along the inside edge of the next adjacent arm. For example, groove 62 extends along the outside edge of arm 56 and the inside edge of arm 60 and groove 64 extends along the outside edge of arm 60 and the inside edge of arm 58.

Each spring arm includes three sections, inner section 66, intermediate section 68, and outer section 70. The outside edge of each arm is a substantially smooth arc A1 of a constant radius having a center point C1 that is not the center of the spring Cc and an inside edge of three arcs A2, A3, and A4, formed by radii R2, R2 and R4 extending form three centers of rotation C2, C3, and C4. This multiple arc design provides a thinner intermediate section over a longer distance to thus allow the spring to rotate easily as it moves back and forth along its operating axis, thereby reducing the distortion of the motion.

FIG. 2B shows a variation of the design shown in FIG. 2A, wherein arcs $A1^a$ and $A3^a$ have the same center point producing a intermediate section $68^a$ of constant width.

Figure 3A:
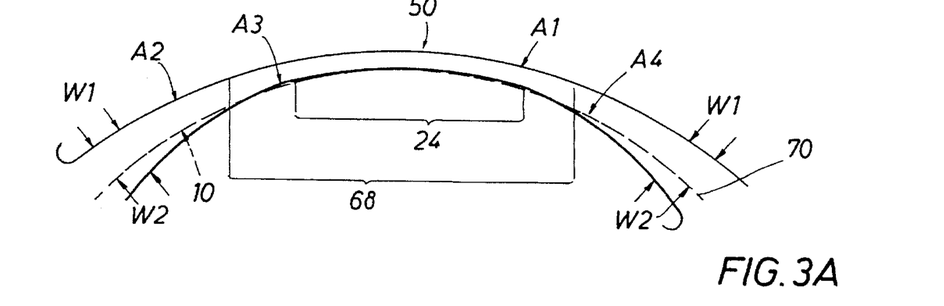
FIGS. 3A and 3B are enlarge plan views of an arm of the geophone spring of this invention and an arm of the prior art geophone spring.

FIG. 3A is an enlarged view of one of the arms of spring 50 superimposed on prior art spring arm 10, the outside edge of which has the same radius of curvature as arm 50 and an inside edge shown dashed arc 70. The length of the intermediate section obtainable by the present invention is indicated by the bracket 68. The length of the section of minimum width obtainable by the prior art spring indicated by the bracket 24. With the prior art spring, longer intermediate sections are obtained by reducing the width of the inner and outer sections, which makes the spring more susceptible to damage due to lateral shock. FIG. 3A shows that a longer minimum width intermediate section, can be obtained, while maintaining wider end sections (W1), as compared with width W2 of the prior art.

Figure 3B:
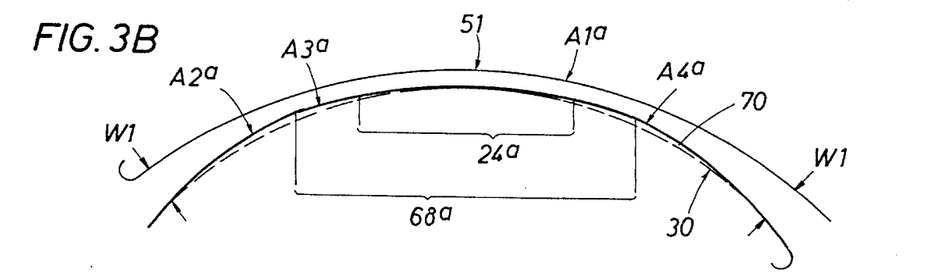

FIG. 3B shows a multiple arc spring 51 superimposed on prior art spring 30 (FIG. 1B), wherein the inner and outer end sections of both arms on the multiple arc spring are substantially the same width (W1) as those on the prior art spring. Again, the length of the intermediate section of the multiple arc design as indicated by the bracket $68^a$ is much longer than the intermediate section of the prior art design as indicated by bracket 24$^a$.

A longer minimum width intermediate section reduces the spring distortion. Nevertheless, if the length of the intermediate section gets too long, the spring will become more susceptible to damage due to lateral shock. The wider inner and outer sections provide resistance to lateral shock. Therefore, a spring made in accordance with this embodiment of this invention can be optimized to obtain a certain spurious response, distortion, and resistance to lateral shock by varying the radii and center points of arcs A1, A2, A3, A4 and A1$^a$, A2$^a$, A3$^a$, A4$^a$ in order to vary the lengths and width of the inner, intermediate, and outer sections independently.

The width of the inner and outer sections and the curvature and the length of arc A1 determine the lowest spurious frequency that is caused by rotation, translational movement, rocking and bending of the geophone spring mass system.

There is no requirement that the inner end section and the outer end section be the same width or the same length. To the contrary, the ability to vary the width of these sections allows a spring designer to define a ratio to compensate for any non-linearity in the spring or tension system.

Figure 4:
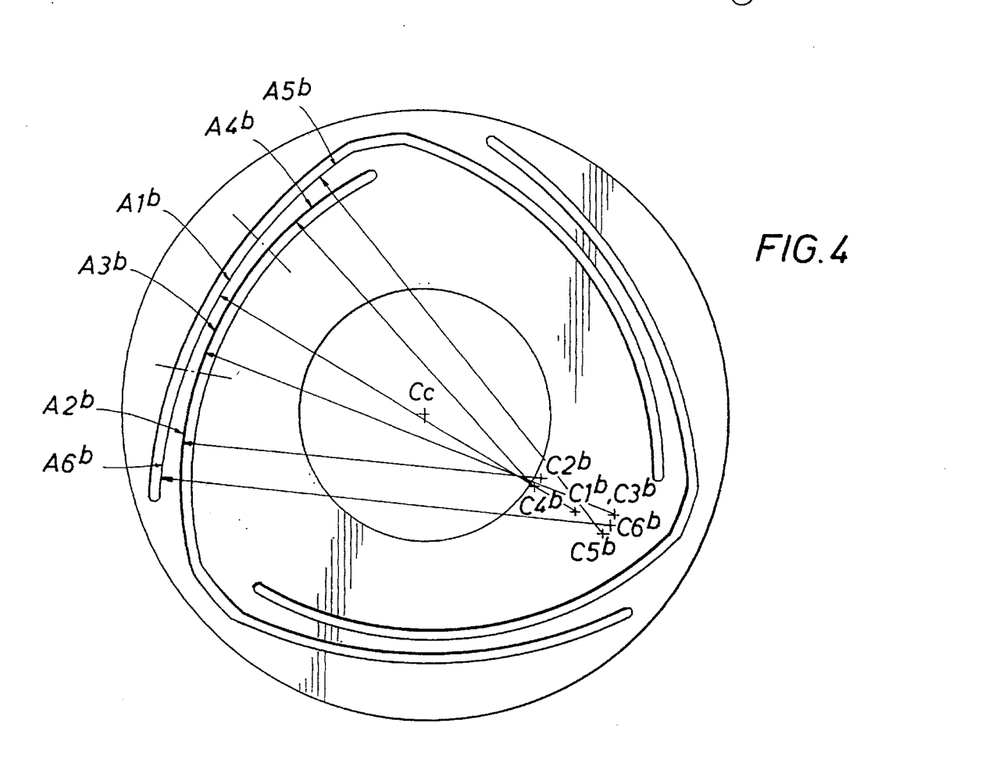
FIG. 4 is a plan view of an alternate geophone spring of this invention.

Although the embodiment of this invention described above utilizes a four-arc spring arm, a multi-arc, multisectional approach can be used. For example, the arc represented by A1 in FIGS. 2A and 2B could be represented by more than one arc, each having different radii and center points. FIG. 4 shows a multi-arc Spring wherein the outside edge of each arm is comprised of three arcuate surfaces. All that is required, is that the outside edge of the arm must be formed by a radius or radii that are not centered at the center of the geophone structure, which is typically the center of the outside diameter of the spring.

Figure 5:
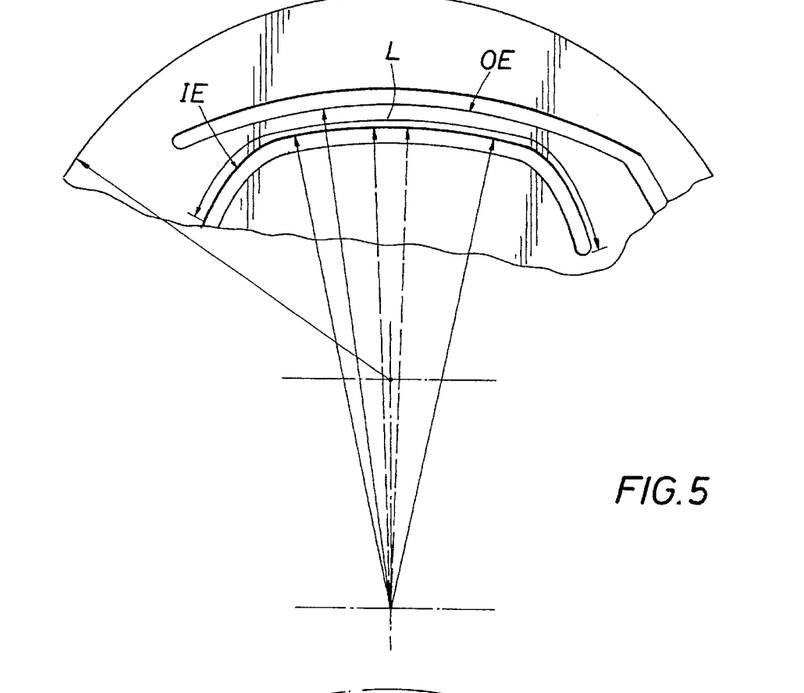
FIG. 5 is a plan view of a spring arm made in accordance with an alternate embodiment of this invention.

It is also not necessary that arcs be used to define the shape of the outside and inside edges of the arms. For example, FIG. 5 shows an enlarged view of a spring arm having a constant radius arc as outside edge OE and a curve having a plurality of curved surfaces as inside edge IE. The length of inside edge IE is designated as L. The radius of curvature at any given point on inside edge IE is never greater than the radius of curvature of the outside edge. Using an inside edge having a plurality of curved surfaces or spiral curves provides for optimizing the length and width of the intermediate section and the end sections.

Although it is not necessary to have a spring with a constant width intermediate section, it is preferable to obtain a constant width intermediate section that comprises from 5% to about 30% of the total length L of the inside edge IE. However, a constant width of between 2% and 50% should provide better results than the prior art springs.

Figure 6A:
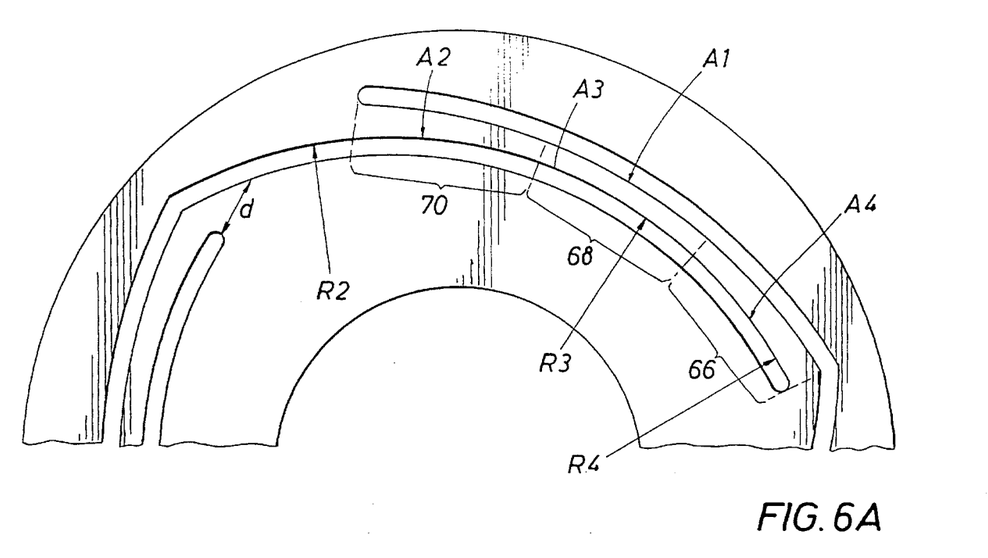
FIGS. 6A, 6B, and 6C are enlarged plan views of the upper portion of the spring shown in FIG. 2A, the upper portion of an alternate geophone spring, and the section shown in circle 6C.

It has been discovered a modification of the spring arms shown in FIGS. 2A will make the spring more production worthy and less susceptible to parasitic oscillation. FIG. 6A is FIG. 2A on an enlarged scale to better illustrate the structural difference between the spring of FIG. 2A and the embodiment shown in FIG. 6B. The difference in the two is the use of four curves to define the inside edge of spring arms, instead of three. Arcs A1$^c$, A2$^c$, A3$^c$, and A4$^c$ are the same as A1, A2, A3, A4 in FIG. 6A except the curve A2$^c$ extends only for the length within bracket 70. Curve A5 picks up at the end of curve A2$^c$ and increases the distance between the end of slot 61 defining the inside edge of an arm and slot 62 defining the inside edge of the adjacent arm.

Figure 6B:
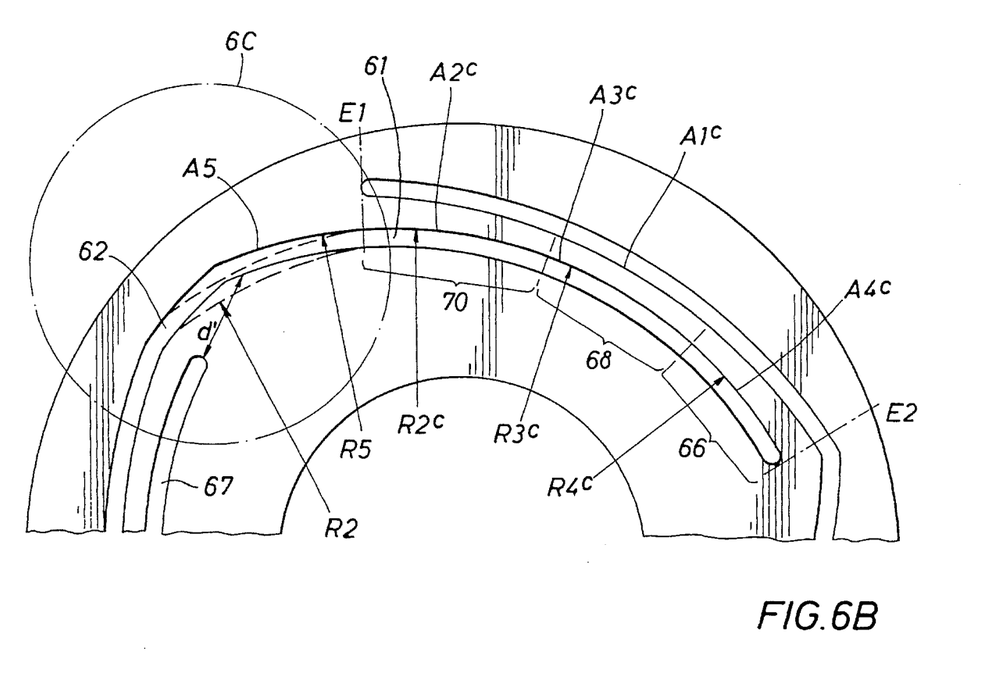
Figure 6C:
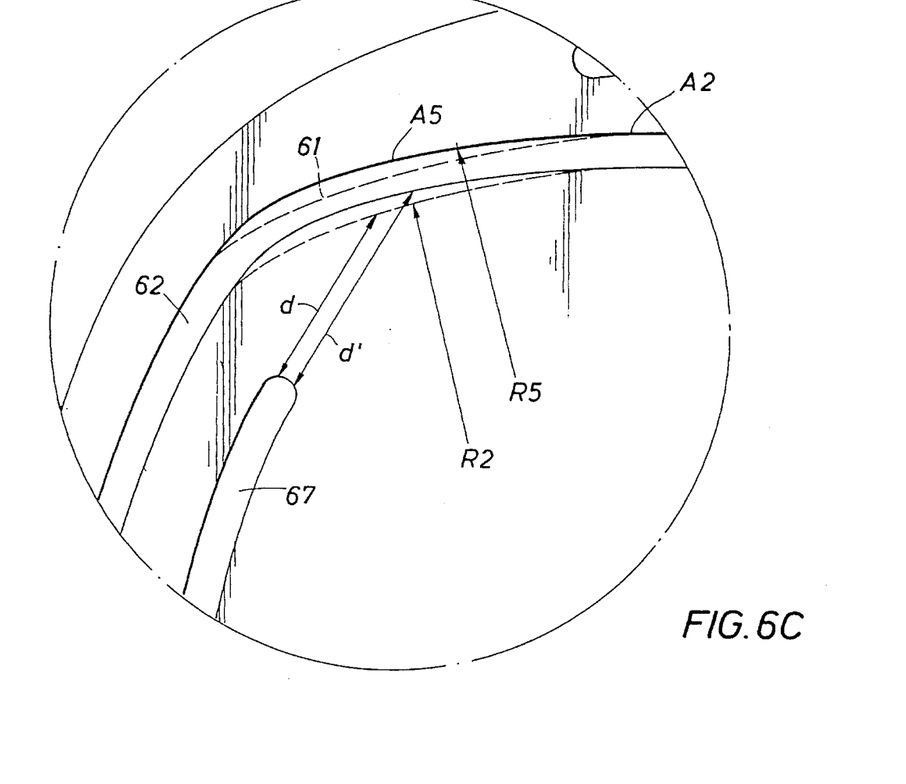

Outer section 70, intermediate section 68, and inner section 66 are maintained the same size in both FIGS. 6A and 6B. The radius and center of curvature of arc A5 are selected to make distance "d'" of FIG. 6B larger than distance "d" of FIG. 6A. The dotted lines in FIG. 6B represent the spring arm shown in FIG. 6A. FIG. 6C is an enlarged view of the circle shown in FIG. 6B. More material is added to the area between the end of slot 61 defining the inside edge of an arm and slot 62 defining the inside edge of the adjacent arm, to prevent this area from interacting with the spring arm section, and thus prevent parasitic oscillation. The length of radius R5 and the respective center of curvature are optimized by an iterative process.

Figure 7:
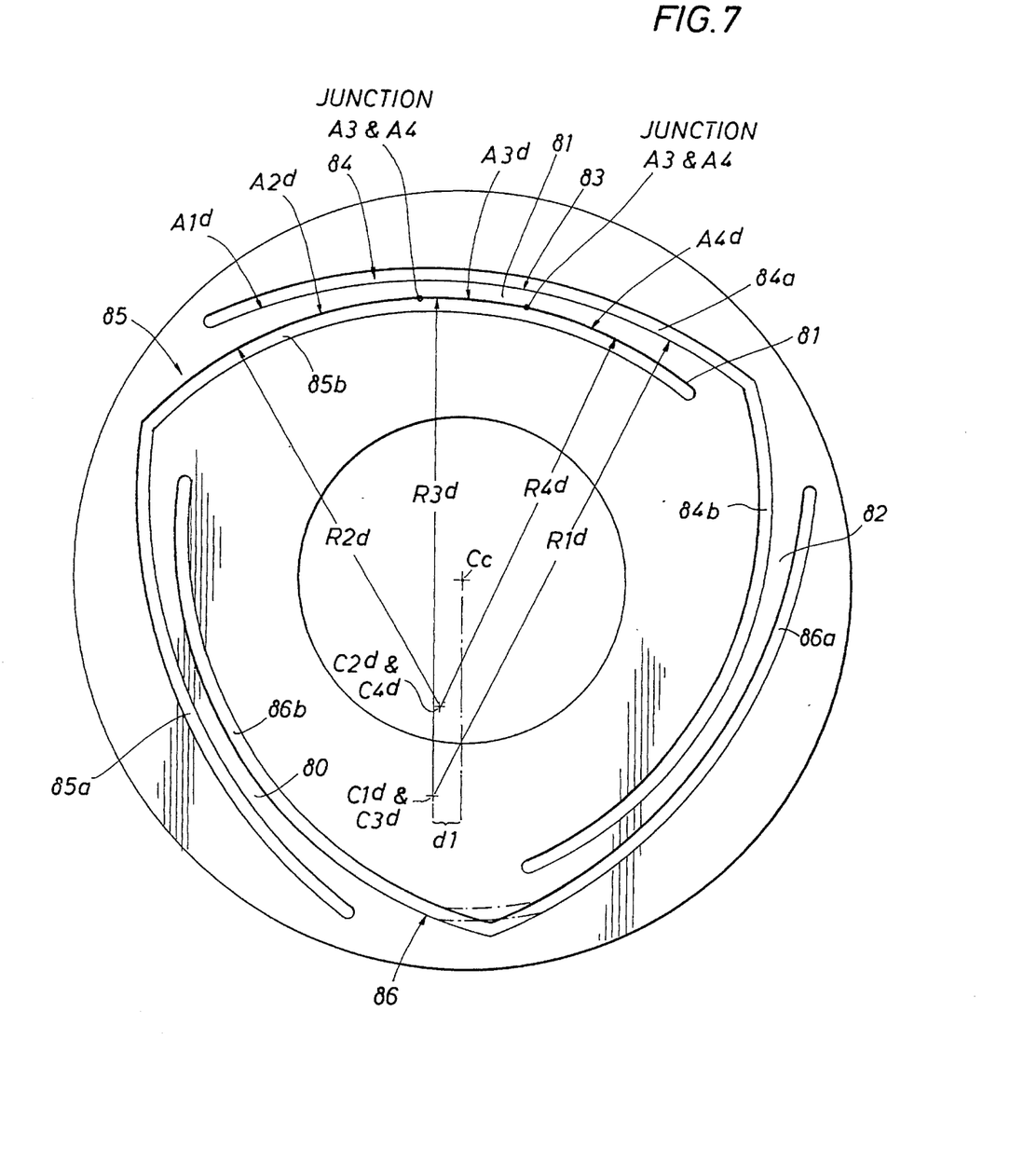
FIG. 7 is a plan view of another alternate embodiment of the geophone of this invention.

In the embodiments shown in FIGS. 2A, 2B, and 4, each slot has a short section in the center that was close to and generally parallel to the perimeter of the spring. These sections are numbered 62a, 64a and 67a in FIG. 2A. The effect of this as shown in dotted lines between arm 80 and 82 in FIG. 7, is to reduce the metal between the end of section 84b of slot 86. Therefore, in the embodiment shown in FIG. 7 the centers of curvatures C1 and C3 are shifted laterally a distance "d1" to move arm 81 closer to the perimeter of the disc at both ends and to provide an elongated arm having a intermediate section of uniform width and a slight curvature. The offset location of centers of curvature C1$^d$ and C3$^d$ is approximately one or two degrees off center. This offset provides for a smoother operation between the springs in the spring system, the springs on either side of a coil form.

The centers of curvature C2$^d$ and C4$^d$ are also shifted laterally to allow section 85a and 85b of slot 85 to intersect close to the perimeter of the disc and eliminate the previously used short connecting sections. As a result, the distance between the end of slot section 86b and slot section 85a is increased thereby increasing the ability of the end section to resist lateral shock.

The spring has three identical spring arms 80, 81, and 82. Only spring arm 81 will be described in detail. Outside edge 83 of the arm lies on arc A1$^d$ of radius R1$^d$ and has a center of curvature located at C1$^d$. Inside edge 81 lies on three arcs A2$^d$ A3$^d$ and A4$^d$ of radii R2$^d$ R3$^d$ and R4$^d$ having centers of curvature C2$^d$ C3$^d$ and C4$^d$ respectively. The several embodiments of this invention described above show the versatility of the present invention. The optimum length of the entire leg, or the optimum length of the intermediate section depends on many factors, such as the outer diameter of the spring, the spring material use, and the mass of the moving coil. The criteria is such that the arm will not buckle under the load of the moving mass and during drop testing. Therefore, a spring leg could be optimized for any given parameters by one of ordinary skill in the art.

The center of radius of curvature for both inside edge and outside edge of any arm can be outside the perimeter of the spring. This will provide even higher spurious vibration modes and produce higher distortion. However, the spring is more vulnerable to destruction under lateral shocks.

In order to make the springs described above more field worthy, different kinds of shock damper should be incorporated to reduce the axial shocks, lateral and rotational shocks such as those disclosed in the '049 patent.

It is also not necessary that the two end sections be position at equal distances from the center of the spring disc. The inner section could be closer to the center of the spring and the outer section could be closer to the perimeter of the disc.

From the foregoing it will be seen that this invention is one well adapted to obtain all of the ends and objects herein above set forth, together with other advantages which obvious and which are inherent to apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth are shown in the accompanying drawings is to interpreted as illustrative and not in a limiting sense.

What is claimed is:

1. A disc-shaped spring, for use in a geophone, to suspend a coil form from a permanent magnet assembly for reciprocal movement relative to the magnet assembly, comprising an outer ring, an inner ring, and a plurality of arms extending between and connected to the outer ring and the inner ring, said arms being formed by a plurality of slots, each of which extends along the outside edge of one arm and the inside edge of an adjacent arm, said slots being shaped so that the outside edge of each arm has the same radius of curvature and a center point which is located in the area of the disc-shaped spring on the opposite side of the center of the disc, and an inside edge having a plurality of curved surfaces including at least one intermediate surface opposite from the outside edge and two end surfaces that diverge from the outside edge, to provide each arm with a thin intermediate section that makes up no more than 30% of the total length of the arm and end sections that increase in width in the direction of the ring to which they are attached producing a spring with a high frequency spurious response that is less susceptible to damage due to lateral shock.

2. The spring of claim 1, wherein one of the end surfaces of the inside edge and a portion of the other end surfaces of each arm have the same radius of curvature and the same center point and wherein the inside edge of the other end surfaces includes an additional end surface portion having a different radius of curvature and a different center point from the other portion of the end surface in order to increase the distance between the end of the slot defining the other end surface and an adjacent slot defining the inside edge of an adjacent arm to make the spring more production worthy and less susceptible to parasitic oscillation.

3. The spring of claim 1, wherein the centers of curvature of each side of the inside edge are located on opposite sides of the line extending from the center of the outside edge through the center of the disc.

4. The spring of claim 1 wherein the end surfaces of the outside edge have the same radius of curvature and the same center point and the end surfaces of the inside edge have the same radius of curvature as each other, but different from the end surfaces of the outside edge, and the same center point, thereby producing symmetrical end sections of the same increasing width.

5. The spring of claim 1 wherein the end sections have different widths.

6. The spring of claim 1, wherein each end surface of the inside edge follows a spiral curve.

7. A dic-shaped spring, for use in a geophone, to suspend a coil form from a permanent magnet assembly for reciprocal movement relative to the magnet assembly, comprising an outer ring, an inner ring, and a plurality of arms connecting the outer and inner rings, said arms being formed by a plurality of slots, each of which extends along the outside edge of one arm and the inside edge of an adjacent arm, said slots being shaped to provide each arm with an outside edge having a plurality of curvatures having the same constant radius of curvature and the same center point to produce an outside edge having a constant radius of curvature, an inside edge having a plurality of curvatures such that the of curvature at any point on the inside edge is never greater than the radius of curvature of the opposite point located radially on the outer edge, wherein the distance between the outer edge and the inside edge is constant within a intermediate section comprising at least 2% and no more than 30% of the total length of the inside edge, and the distance between the outside edge and the inside edge increases within the remainder of the length of the inside edge and does not decrease at any point along said arm.

8. The spring of claim 7, wherein the remainder of the length of the inside edge is symmetrical about the intermediate section.

9. The spring of claim 7, except that said intermediate section comprises at least 5% and not more than 30% of the total length of the inside edge.

10. The spring of claim 7, wherein the curvature of the inside edge decreases, such that the distance between the inside and outside edges beyond the central section increases and is symmetrical.

11. A disc-shaped spring, for use in a geophone, to suspend a coil form from a permanent magnet assembly for reciprocal movement relative to the magnet assembly, comprising an outer ring, an inner ring, and a plurality of arms connecting the outer and inner rings, said arms being formed by a plurality of slots, each of which extends along the outside edge of one arm and the inside edge of an adjacent arm, said slots being shaped to provide each arm with a long thin intermediate section that increases in width in opposite directions from its mid-point and outer sections with outer edges that follow a spiral curve connecting the intermediate section to the inner and outer rings that increase in width toward the inner and outer rings, to provide a spring that has a high frequency spurious response and that is less susceptible to being damaged by lateral forces acting on the geophone.

12. A disc-shaped spring, for use in a geophone, to suspend a coil form from a permanent magnet assembly for reciprocal movement relative to the magnet assembly, comprising an outer ring, an inner ring, and a plurality of arms extending between and connected to the outer ring and the inner ring, said arms being formed by a plurality of slots, each of which extends along the outside edge of one arm and the inside edge of an adjacent arm, said slots being shaped to provide each arm with an arcuate outside edge having a radius of curvature, the center of which is located in the area of the disc-shaped spring on the opposite side of the center of the disc, and an inside edge having an arcuate intermediate surface and arcuate end surfaces, the radius of curvature of the intermediate surface of the inside edge being less than the radius of curvature of the outside edge, to provide each arm with a long, think, slightly curved, intermediate section and end sections that increase in width in the direction of the ring to which they are attached producing a spring with a high frequency spurious response that is less susceptible to damage due to lateral shock and wherein the two end surfaces of the inside edge have the same radius of curvature and the same center point and wherein the inside edge includes an additional surface extending from the end of the outer end surface having a different radius of curvature and a different center point from the end surfaces in order to add more material to the area between the end of one slot defining the inside edge of an arm and an adjacent slot defining the inside edge of an adjacent arm.

* * * * *